United States Patent [19]

Adorjan

[11] Patent Number: 4,637,637
[45] Date of Patent: Jan. 20, 1987

[54] PIPELINE SYSTEM WITH ENCAPSULATED INSULATION

[75] Inventor: Alexander S. Adorjan, Pearland, Tex.

[73] Assignee: Exxon Production Research Co., Houston, Tex.

[21] Appl. No.: 680,421

[22] Filed: Dec. 11, 1984

[51] Int. Cl.⁴ .............................................. F16L 59/14
[52] U.S. Cl. ...................................... 285/47; 285/55; 138/121; 138/149
[58] Field of Search ................. 285/47, 55; 138/28, 138/121, 122, 149, 173

[56] References Cited

U.S. PATENT DOCUMENTS

| | | | |
|---|---|---|---|
| 2,742,384 | 4/1956 | Burleson | 154/44 |
| 3,388,724 | 6/1968 | Mowell et al. | 138/149 |
| 3,453,716 | 7/1969 | Cook | 285/47 X |
| 3,844,587 | 10/1974 | Fuhrmann et al. | 285/47 |
| 3,865,145 | 2/1975 | McKay et al. | 138/113 |
| 3,885,595 | 5/1975 | Gibson et al. | 138/155 |
| 4,060,263 | 11/1977 | Kotcharian | 285/47 |
| 4,219,224 | 8/1980 | Hanley | 285/47 |
| 4,366,917 | 1/1983 | Kotcharian | 220/442 |

FOREIGN PATENT DOCUMENTS

| | | | |
|---|---|---|---|
| 2342528 | 2/1975 | Fed. Rep. of Germany | 285/47 |
| 632329 | 9/1982 | Switzerland | 285/47 |
| 1337394 | 11/1973 | United Kingdom | 285/47 |

Primary Examiner—Richard J. Scanlan, Jr.
Attorney, Agent, or Firm—J. M. Hoster

[57] ABSTRACT

A pipeline system which is capable of withstanding a range of extreme temperatures is disclosed. A pipe is surrounded by a vapor barrier which has a corrugated surface facing the pipe. The amplitude of the corrugations changes, absorbing the stress imposed by extreme temperatures, especially those at which liquefied natural gas is carried.

7 Claims, 4 Drawing Figures

PIPELINE SYSTEM WITH ENCAPSULATED INSULATION

FIELD OF THE INVENTION

The invention relates to pipeline systems with insulation surrounding a transport pipe. The invention more particularly relates to pipeline systems designed for use in a submarine environment as a liquefied natural gas carrier.

BACKGROUND OF THE INVENTION

Pipelines often transport products at temperatures which must be maintained at a constant level in order to prevent loss of product. For example, Liquefied Natural Gas (LNG) is generally transported at approximately −160° C. occur if the temperature of the pipeline increases.

In order to minimize heat loss, and the resulting loss of the product, thermal insulation is a necessary component of pipeline systems in which a substantially constant temperature must be maintained. Polyurethane foam is conventionally used because of its low thermal conductivity.

Thermal insulation must be protected in order to retain its effectiveness. The insulation may be destroyed if it is placed in contact with a transport pipe which is subject to expansion and contraction. As the transport pipe expands and contracts, the insulation material in contact with the pipe may move and tear, exposing the pipe, which may result in greater heat loss. A gap is conventionally left between the pipe and the insulation to allow free pipe movement and prevent contact with the insulation. However, water or gases with comparatively high thermal conductivity can diffuse into the insulation from the gap. The thermal conductivity of the insulation will increase over time as gases or water continue to diffuse. The diffusion process and the resulting degradation of the insulation's effectiveness are called "aging".

Aging occurs more rapidly proportionally with temperature increases. So, it would appear that aging would not be a concern at the low temperature at which LNG is transported. However, because of thermal stress caused by the low temperature, cracks may form in the insulation in which water vapor or water may enter and freeze, causing mechanical damage.

Gases and water can be kept out of the insulation by using vapor barriers of low permeability to encase the insulation. The vapor barrier also prevents destruction of the insulation resulting from pipe movement.

However, conventional vapor barriers are not effective where a product such as LNG is being transported at extremely low temperatures. The barriers are typically secured by field joints which prevent expansion and contraction. However, the vapor barrier is then subjected to thermal stress (which is a product of the total thermal contraction resulting from the temperature change and the material's modulus of elasticity). If this stress exceeds the tensile strength of the vapor barrier, failure may occur. The same problems previously discussed may result. If the vapor barrier or insulation is destroyed, detection of damage and repair are expensive and logistically difficult.

There is clearly a need for an insulated pipeline system designed to withstand the thermal stress caused by transport of products at extreme temperatures without an increased loss of product.

SUMMARY OF THE INVENTION

The pipeline system of the invention has insulation surrounding an inner pipe. The pipe carries a product, such as LNG, at an extreme temperature compared to ambient temperature. The insulation material is encapsulated by an interior vapor barrier and an exterior vapor barrier, preferably made of glass reinforced epoxy resin. The interior barrier, which separates the insulation material from the inner pipe, has two corrugated surfaces. The corrugations act like bellows to allow the interior vapor barrier to move without failure enabling it to withstand stresses such as the thermal stress caused by the low temperature of a LNG carrying pipe.

In a preferred embodiment, the pipeline system of the invention includes a first interior vapor barrier having two corrugated surfaces with one surface facing the outer surface of the inner pipe. Insulation material is molded to the outer surface of the first vapor barrier. A second vapor barrier is molded to, and encases, the insulation material which is thereby completely encapsulated.

DETAILED DESCRIPTION OF THE PREFERRED EMBODIMENT

The invention is an improved pipeline system including a vapor barrier separating a transport pipe from surrounding insulation material. The vapor barrier minimizes heat loss in the transport pipe by preventing the entry of water and gases into the insulation, thus preventing subsequent aging of the insulation. The corrugations allow the vapor barrier to withstand stresses such as the thermal stress imposed by the low temperature of a LNG pipeline. While the invention will be discussed in its submarine LNG pipeline system embodiment, it is not intended that the practice of the invention be limited to submarine LNG pipeline systems. For example, extremely hot substances such as oil having a high temperature may be carried through a pipeline system having a corrugated vapor barrier.

Figure 1:
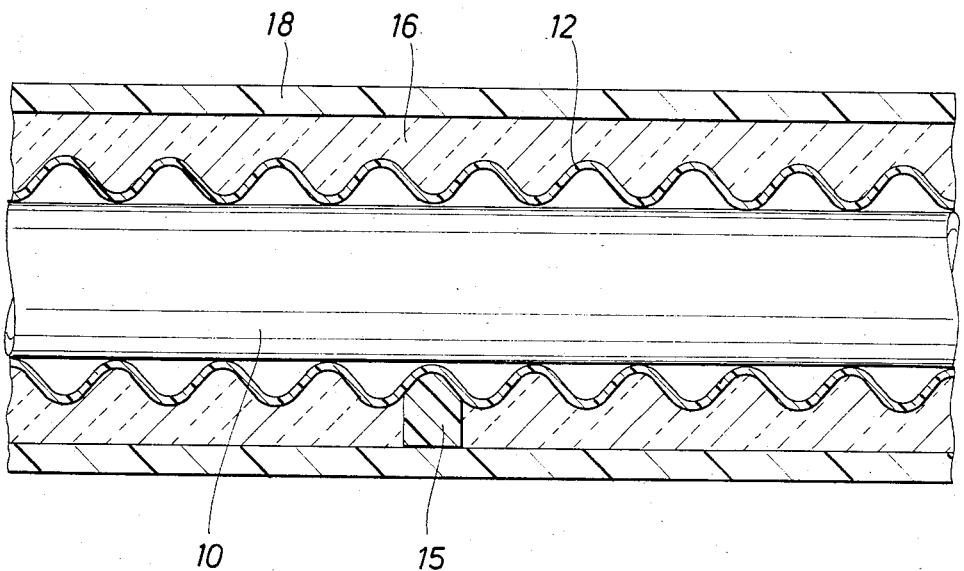
FIG. 1 is a longitudinal cross-sectional view of a pipe section surrounded by an interior vapor barrier having a corrugated inner surface.

The preferred embodiment may be more easily understood with reference to FIG. 1. Conventional pipe section 10 is surrounded by first vapor barrier 12, preferably made of glass reinforced epoxy resin. In FIG. 1, both the interior and exterior surfaces of vapor barrier 12 are corrugated. Vapor barrier 12 surrounds the outer surface of pipe 10. Brace 15 centers pipe 10 and vapor barrier 12. Insulation material 16 is molded in a cylindrical shape to the exterior surface of vapor barrier 12. Second vapor barrier 18, also preferably made of glass reinforced epoxy resin, encases insulation material 16, so that insulation material 16 is completely encapsulated by vapor barriers 12 and 18.

Figure 2:
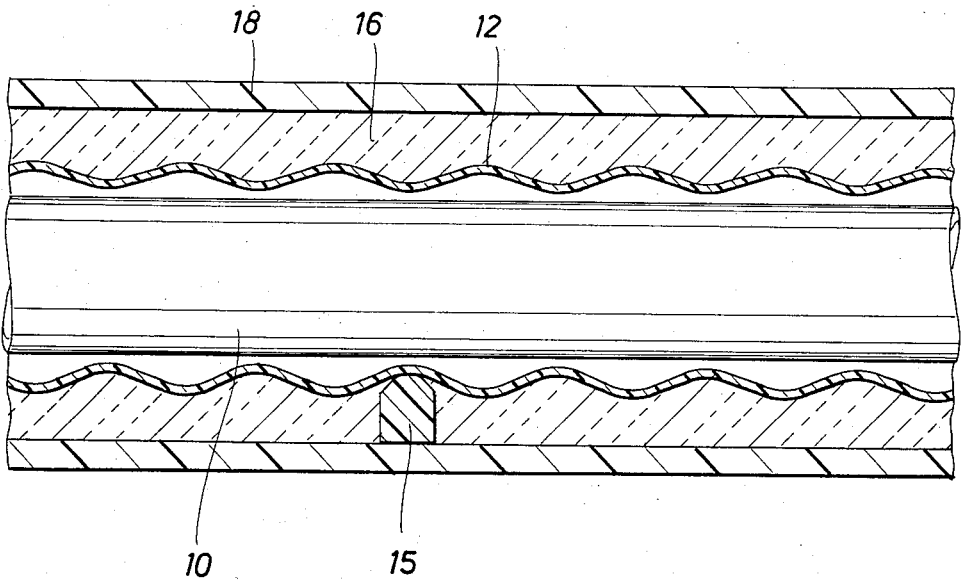
FIG. 2 is a longitudinal cross-sectional view of the pipeline system section of FIG. 1 in which the interior vapor barrier is subjected to an extremely cold temperature.

In contrast to a smooth vapor barrier, corrugated vapor barrier 12 of the invention can withstand much larger thermal stress. The amplitude of the corrugation profile will be decreased as vapor barrier 12 is subjected to increased thermal stress. The stress is absorbed by the decrease in amplitude of the corrugated inner surface of vapor barrier 12. Thus, the material will not fail due to the stress resulting from the extremely low LNG temperature. FIG. 2 shows the vapor barrier 12 as it appears during the transport of a product such as LNG at an extremely low temperature.

Glass reinforced epoxy resin is the preferred material for vapor barriers 12 and 18. Epoxy resin is highly impermeable and has a high tensile strength. In addition, the use of epoxy resin allows encapsulation of the insulation prior to installation in a pipeline system. Epoxy resin can be applied in a liquid state to both surfaces of hollow, cylindrically shaped insulation material by pouring or spraying. The insulation is encased as the epoxy resin hardens. The corrugations can be formed by machining after application, or by use of a mold having a corrugated surface. The encased section of insulation material can then be placed around a pipe section.

Insulation material 16 is preferably a polyurethane foam produced by using a halogenated hydrocarbon such as trichlorofluoromethane as a blowing agent. A halogenated hydrocarbon is chosen because it has a high molecular weight which results in a low gaseous thermal conductivity. In addition, polyurethane foam has a small solid content which contributes to the low thermal conductivity.

The pipeline system of the invention offers numerous advantages over conventional pipeline systems. The corrugations on vapor barrier 12 relieve stresses such as the thermal stress caused by the extremely low temperature of a LNG carrying pipe. Without the corrugations, vapor barriers 12 and 18 would be vulnerable to cracking due to thermal stress, and water and gases would be free to enter the insulation.

In the pipeline system of the invention, gases and water cannot permeate insulation material 16, which will retain its low thermal conductivity. Thus, insulation material 16 will not have to be replaced as frequently, lessening the cost and risk of destruction of a pipeline system. In a submarine LNG pipeline system, for example, there is no convenient way to replace the insulation without pulling the system out of the water.

Pipe 10 tends to expand and contract. As discussed previously, insulation material 16 can be torn if it is not protected. Vapor barrier 12 provides a strong surface against which pipe 10 can move without damaging the insulation.

Figure 3:
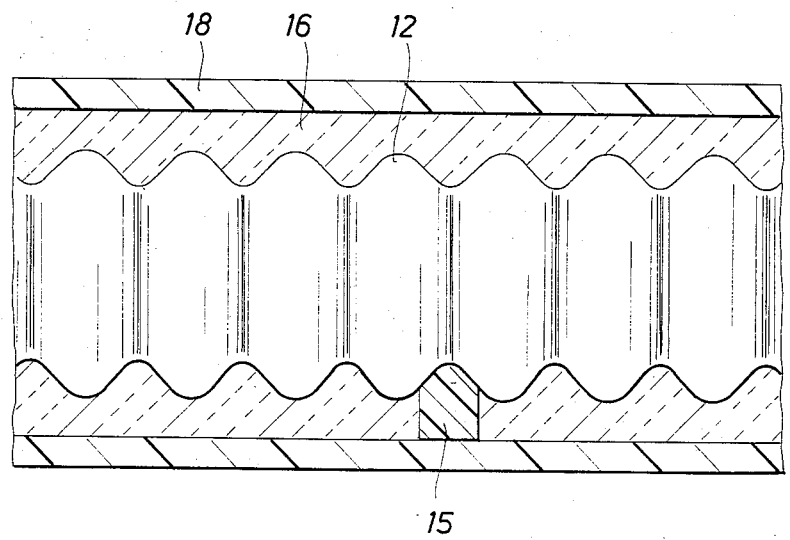
FIG. 3 is a view, partly in cross-sectional view and partly in elevational view, of an interior vapor barrier (shown in elevational view), having a bellows-like shape, and an exterior vapor barrier and insulation material (both shown in longitudinal cross-sectional view) surrounding the interior vapor barrier.
Figure 4:
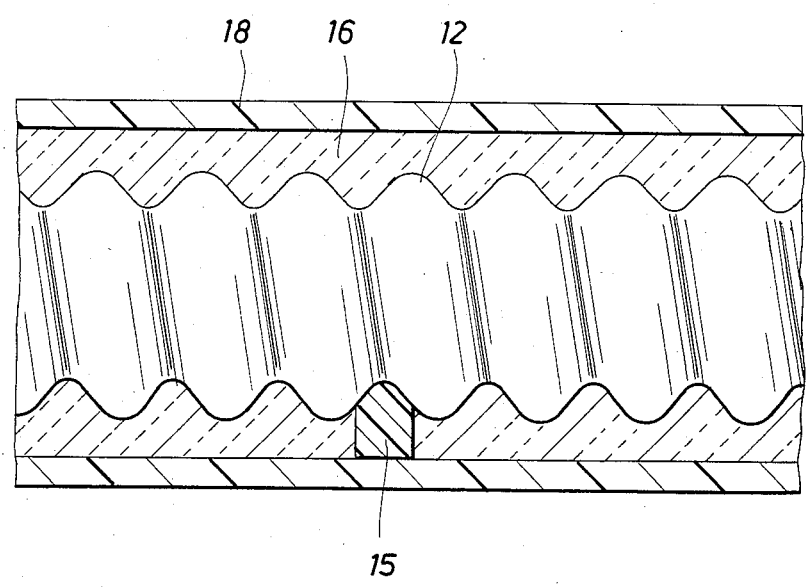
FIG. 4 is a view, partly in cross-sectional view and partly in elevational view, of an interior vapor barrier (shown in elevational view), having a helical shape, and an exterior vapor barrier and insulation material (both shown in longitudinal cross-sectional view) surrounding the interior vapor barrier.

The corrugations in vapor barrier 12 may desirably be formed in any of a variety of shapes. FIG. 3 shows corrugated vapor barrier 12 having a bellows-like configuration. FIG. 4 shows corrugated vapor barrier 12 having a helical shaped corrugation.

Each of these views shows vapor barrier 12 prior to installation in a pipeline system. Further, while the surface of vapor barrier 12 which faces pipe 10 is always corrugated, the surface of vapor barrier 12 which faces insulation material 16 may be smooth or corrugated.

Other configurations of the pipeline system of the invention are envisioned. The foregoing description is illustrative only and other variations on the specific embodiment described above may be employed without departing from the scope of the invention described in the claims.

What is claimed is:

1. A section of a pipeline system, comprising:
   a section of pipe;
   a first vapor barrier surrounding said pipe section having a first surface facing said pipe section and a second surface opposite said first surface, said first surface having a corrugated construction;
   insulation material having a first surface and a second surface, said insulation material concentrically spaced from said pipe section, the first surface of said insulation material encasing and adhering to the second surface of said vapor barrier; and
   a second vapor barrier concentrically spaced from said pipe section, said vapor barrier encasing and adhering to the second surface of said insulation material.

2. The pipeline system section of claim 1 wherein the first vapor barrier and the second vapor barrier are made of glass reinforced epoxy resin.

3. The pipeline system section of claim 1 wherein the insulation material is polyurethane foam.

4. The pipeline system section of claim 1 wherein the first corrugated surface of the first vapor barrier has a generally bellows-shaped configuration.

5. The pipeline system section of claim 1 wherein the second surface of the first vapor barrier has a corrugated construction.

6. The pipeline system section of claim 1 wherein said first vapor barrier and said second vapor barrier are fabricated so as to encase insulation material having a hollow cylindrical shape prior to installation.

7. The pipeline system section to claim 6 wherein each pipe section is surrounded by the encased insulation material prior to installation.

* * * * *